US006978527B2

(12) United States Patent
Oser

(10) Patent No.: US 6,978,527 B2
(45) Date of Patent: Dec. 27, 2005

(54) FUEL INJECTOR REMOVAL TOOL

(75) Inventor: Adam Oser, Fort Lupton, CO (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/736,430

(22) Filed: Dec. 15, 2003

(65) Prior Publication Data

US 2004/0187283 A1 Sep. 30, 2004

Related U.S. Application Data

(60) Provisional application No. 60/433,172, filed on Dec. 13, 2002.

(51) Int. Cl.[7] .............................................. B23P 19/04
(52) U.S. Cl. .............................................. 29/252; 29/265
(58) Field of Search .............................. 29/252, 282, 726, 29/727, 255, 263, 265; 269/3, 6

(56) References Cited

U.S. PATENT DOCUMENTS

| | | | | |
|---|---|---|---|---|
| 4,366,617 A * | 1/1983 | Nanstiel et al. | ............... | 29/727 |
| 4,959,899 A * | 10/1990 | Martin | ........................ | 29/726 |
| 5,208,958 A * | 5/1993 | Wilcox | ........................ | 29/252 |
| 5,385,060 A * | 1/1995 | Wang | ........................ | 73/866.5 |
| 5,799,380 A * | 9/1998 | Pfeifer | ........................ | 29/252 |
| 6,079,092 A * | 6/2000 | Bannerman | .................. | 29/252 |
| 2004/0187283 A1 * | 9/2004 | Oser | ........................ | 29/252 |

* cited by examiner

*Primary Examiner*—Lee D. Wilson
(74) *Attorney, Agent, or Firm*—Willam Scott Andes; David G. Maire; Beusse Brownlee Wolter Mora & Maire, PA

(57) ABSTRACT

Provided is a fuel injector remover for removing a fuel injector from a cylinder head wherein the fuel injector is located within a counterbore of the cylinder head. The remover includes a primer mover having a piston defining a central bore. A snout portion is attached to the prime mover and defines a central bore. The snout portion has a first end attached to the prime mover and a second end defining a tapered portion sized such that when the tapered portion abuts an outer diameter of the cylinder head counterbore, the prime mover is centered over the fuel injector. A puller rod extends through the central bores of the piston and the snout. A thumbscrew is provided for attachment to the threaded end of the puller rod after the puller rod has been inserted through the central bore of the cylinder.

23 Claims, 3 Drawing Sheets

FUEL INJECTOR REMOVAL TOOL

RELATED APPLICATIONS

The present application claims priority to U.S. Provisional Patent Application Ser. No. 60/433,172, filed Dec. 13, 2002, the contents of which are expressly incorporated herein by reference.

BACKGROUND OF THE INVENTION

A. Field of the Invention

This invention relates generally to the field of internal combustion engines, and more specifically to a tool that is used to remove a fuel injector from the cylinder head of an engine.

B. Description of Related Art

Locomotive and other machinery with large diesel engines have fuel injectors that inject fuel into a highly pressurized combustion chamber just before a controlled explosion of that fuel. The injector is typically located in a cylinder head of the motor and a tight sealing relationship must be attained between the injector and the cylinder head to prevent the pressurized gases in the combustion chamber from leaking past the fuel injector. Therefore, the fit between a bore in the cylinder head for the fuel injector and the fuel injector is typically quite close. An O-ring normally assists in providing the seal.

After they have been service for an extended period of time, the fuel injectors require replacement. However, with use, the fuel injectors require considerable force to be removed from the cylinder head because the o-ring becomes hard with time and carbon deposits build up upon the fuel injector and cylinder head and serve to bond the cylinder head and fuel injector together.

In the past, different tools have been used to remove the fuel injectors from the cylinder head with varying results. Before the present invention, the best method of removing the fuel injectors was to thread a slide hammer onto the end of the fuel injector to remove the fuel injector. A slide hammer is essentially a large weight, in a form that can be gripped by a user, with a bore in the center. A long rod is inserted through the bore in the weight and the rod further comprises a rod head that will not extend through the bore of the weight. The user attaches the end of the rod to the fuel injector and repeatedly slams the weight against the rod head to remove the fuel injector.

As can be understood, a slide hammer requires a great amount of force to be exerted by the operator. Accidents with slide hammers are common, such as pinched and broken fingers and injuries from operators losing their balance while operating the slide hammer. Additionally, considerable time may be required to extract stubborn fuel injectors from cylinder heads and, in some instances, the slide hammer simply cannot exert enough force to remove the fuel injector and the entire cylinder head must be removed and replaced, which is a time-consuming and expensive operation.

SUMMARY OF THE INVENTION

The present invention provides a fuel injector remover for removing a fuel injector from a cylinder head wherein the fuel injector is located within a counterbore of the cylinder head. The remover comprises a primer mover having a piston capable of translational motion from a first position to a second position. The piston defines a central bore. A snout portion is attached to the prime mover and defines a central bore generally coaxial with the central bore of the piston. The snout portion has a first end and a second end, wherein the first end is attached to the prime mover. The second end defines a tapered portion sized such that when the tapered portion abuts an outer diameter of the cylinder head counterbore, the prime mover is centered over the fuel injector. A puller rod I also provided and has a first end adapted to be removably engaged with the fuel injector and a second threaded end. The puller rod extends through the central bores of the piston and the snout. A thumbscrew is provided for attachment to the threaded end of the puller rod after the puller rod has been inserted through the central bore of the cylinder. When the puller rod has been attached to the fuel injector, the puller rod has been inserted through the central bore of the piston, and the thumbscrew has been attached to the puller rod, the prime mover may be operated to force the piston from the first position to the second position to separate the fuel injector from the cylinder head.

DESCRIPTION OF THE PREFERRED EMBODIMENT

Figure 1A:
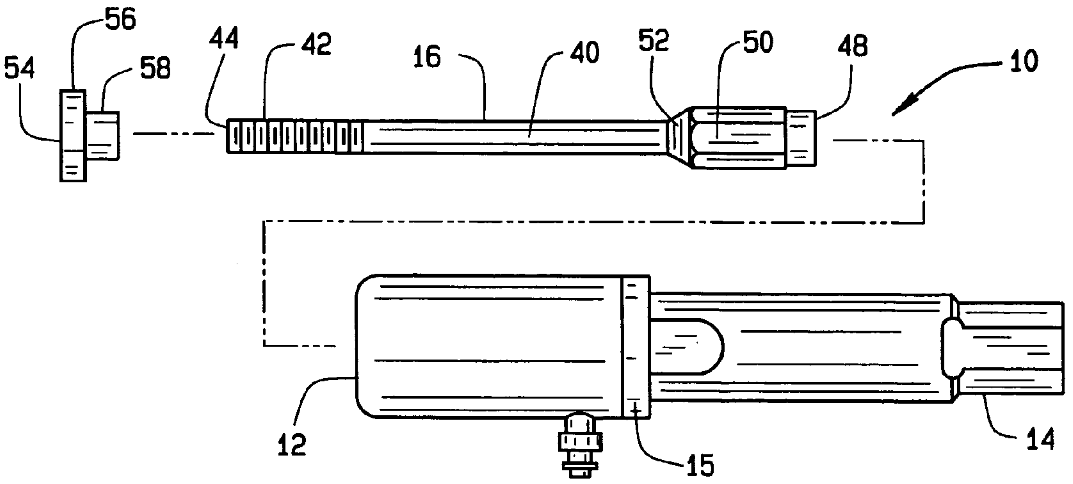
FIG. 1 is a plan view of the injector puller of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1B:
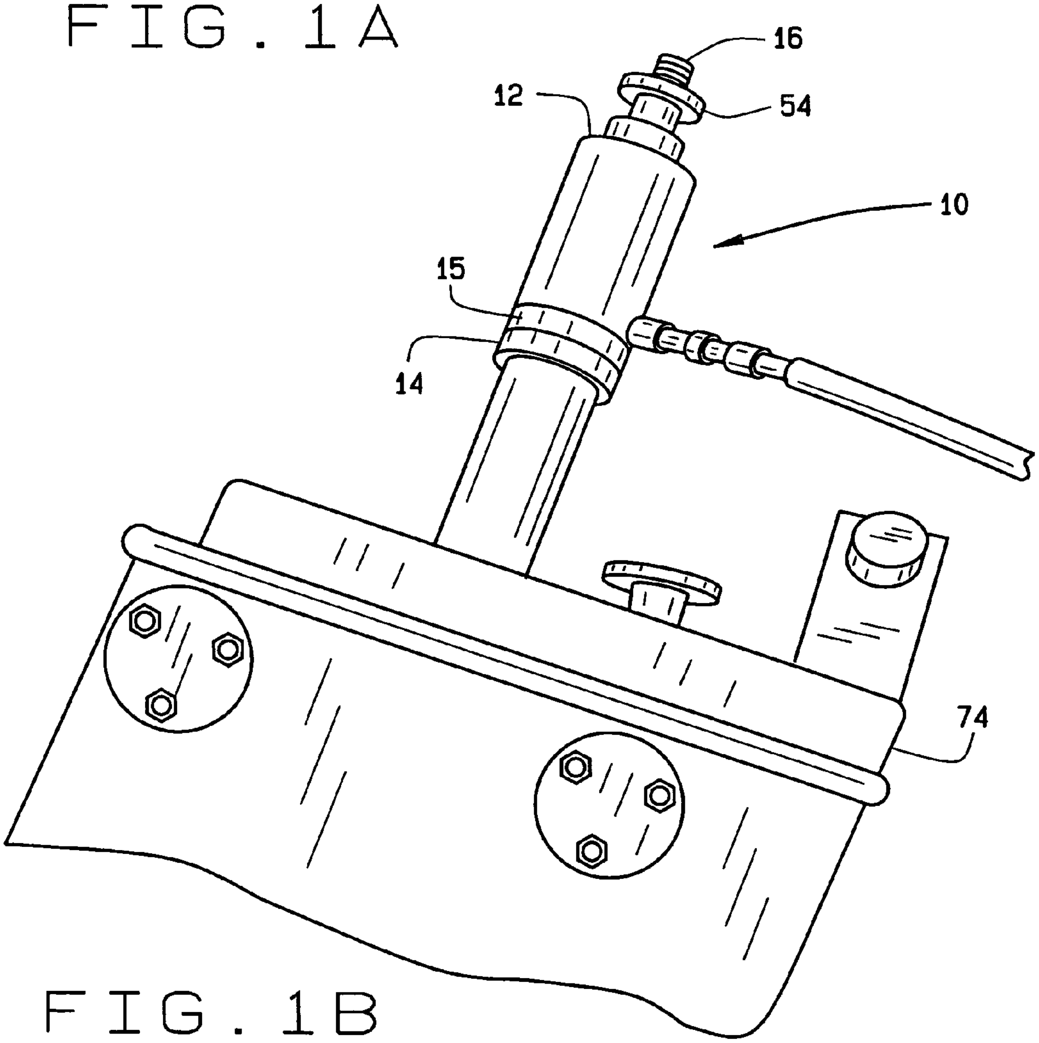

The present invention improves the process of removal of fuel injectors by reducing the time, effort and injury involved with removing fuel injectors from a cylinder head. Referring to FIGS. 1A and 1B, there is provided a fuel injector remover 10 as in the present invention. The fuel injector remover 10 generally comprises a prime mover comprising a hydraulic cylinder 12, a snout portion 14, an interface flange 15 and a puller rod 16. The hydraulic cylinder 12 (FIGS. 1–3) comprises a common hydraulic cylinder that is operated by either an electric or manual hydraulic pump (not shown). The hydraulic cylinder 12 has central bore 11 and a moveable piston 13. The construction and operation of a hydraulic cylinder is well known in the art and the internal details of the hydraulic cylinder 12 are not shown here.

Figure 2:
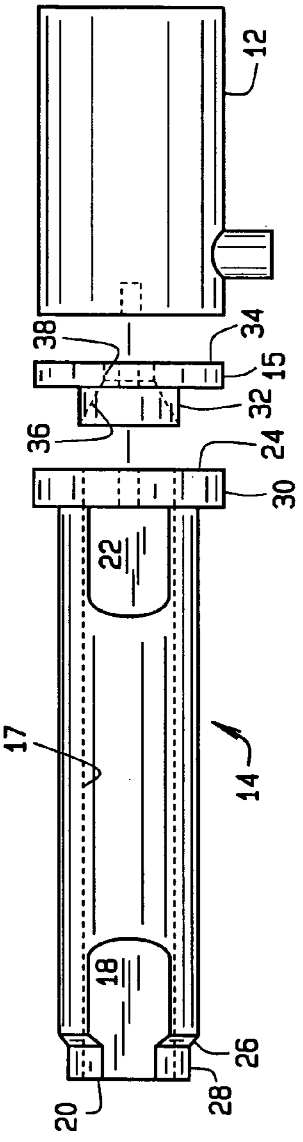
FIG. 2 is an exploded view of the hydraulic cylinder, interface flange and snout portion of the present invention.
Figure 3:
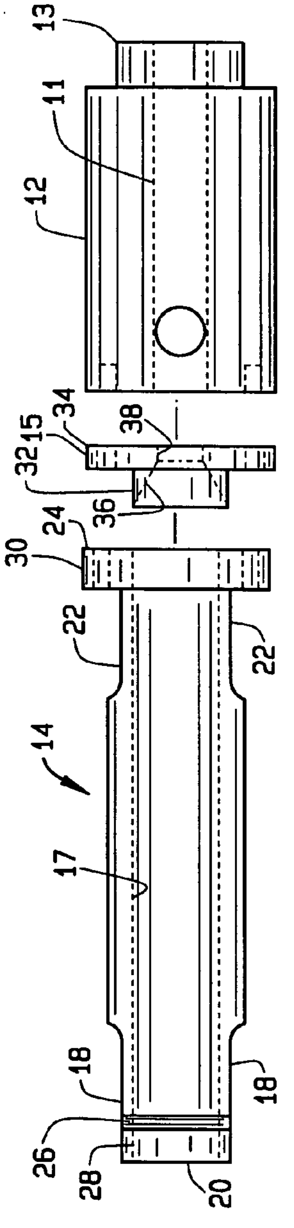
FIG. 3 is a view of the hydraulic cylinder, interface flange and snout portion of FIG. 2 rotated ninety degrees.

Referring to FIGS. 2 and 3, the snout portion 14 is generally cylindrical and comprises a central bore 17 and two flats 18 on a first end 20 and two flats 22 on a second end 24. The first end 20 comprises a tapered portion 26 and a reduced portion 28, the function of which is explained below. Finally, the snout portion 14 comprises a flange 30 at the second end 24.

The interface flange 15 generally comprises a cylindrical portion 32 and a flange 34. The interface flange 15 has a tapered portion 36 and a central bore 38. When assembled in the present invention, the interface flange 15 is maintained in position between the hydraulic cylinder 12 and the snout portion 14 and the cylindrical portion 32 of the interface flange 15 is received by the central bore 17 of the snout portion 14.

Figure 4:
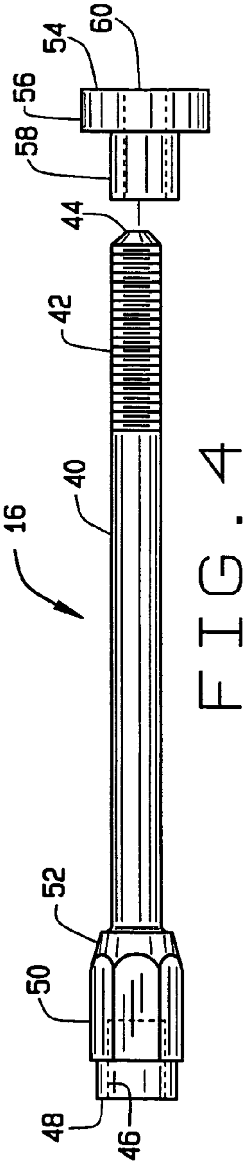
FIG. 4 is a plan view of the puller rod and thumbscrew of the present invention.

Finally, referring to FIG. 4, the puller rod 16 comprises a rod 40 having an external threaded portion 42 at one end 44 and an internal threaded portion 46 at an opposite end 48. The end 48 further comprises a hex-shaped outer surface 50 such that a wrench may be used to turn puller rod 16. The hex-shaped outer surface 50 also comprises a tapered portion 52 that generally corresponds to tapered portion 36 of the interface flange 15. The puller rod 16 also comprises a thumbscrew 54 having a large diameter 56 with a knurled outer surface, a small diameter 58 and a threaded bore 60.

Figure 5:
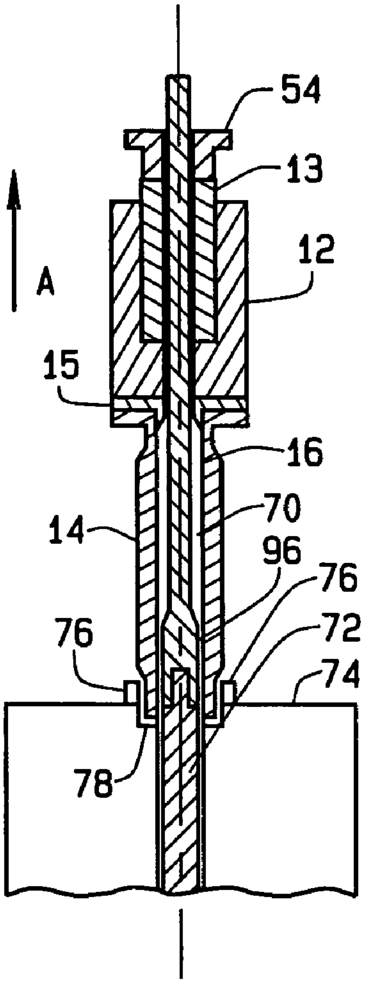
FIG. 5 is a partial section view of the injector puller of the present invention in use removing an injector installed in an engine cylinder head.
Figure 6:
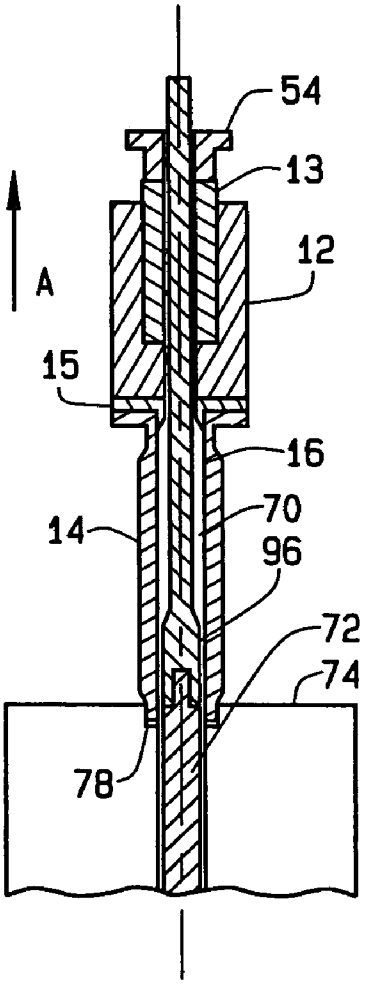
FIG. 6 is a view of the injector puller of the present invention in use removing an injector installed in an engine cylinder head.

Referring to FIGS. 5 and 6, the present invention is operated by first threading the internal threads 46 of the puller rod 16 onto external threads 70 of a fuel injector 72 within a cylinder head 74, perhaps with the assistance of a wrench. The user should be certain to ensure that the puller rod 16 is sufficiently threaded onto the fuel injector 70. Next, the hydraulic cylinder 12, with the snout portion 14 and interface flange 15, attached are placed over the puller rod 16 such that the puller rod 16 extends completely through the central bore 17 and the tapered portion 26 of the snout portion 14 contacts an outer diameter of a bore 78 in which the fuel injector 70 is located. The reduced portion 28 extends within the bore 78. The tapered portion 26 in this manner provides a self-centering function of the hydraulic cylinder 12 over the fuel injector 70. The flats 18 of the snout portion 14 provide clearance for studs 76 that extend from the cylinder head 74 (FIG. 5). The thumbscrew 54 is then threaded onto the external threads 42 of the puller rod 16 until the thumbscrew abuts the piston 13.

At this point, the user operates either a hand pump or an electric pump to pump hydraulic fluid into the hydraulic cylinder 12 to operate the piston 13 in the direction of the arrow A. The movement of the piston 13 moves the puller rod in the direction of the arrow A, thereby removing the fuel injector 70 from the cylinder head 74. If after the moving the piston 13 to the end of its travel, the fuel injector 70 is not completely removed, the piston 13 can be moved back to its initial position and the thumbscrew 54 further threaded onto the puller rod 16 to fully remove the fuel injector 70.

In an alternative embodiment of the fuel injector remover, the end 44 of the puller rod 40 may have external threads engageable with internal threads in the end of a fuel injector, with the shank of the rod being formed to have flats thereon to facilitate turning the rod with a wrench to make-up the connection. In addition, while the cylinder 12 has been described as being a hydraulic cylinder, it may also be a pneumatic cylinder, and a manual or power driven pneumatic pump may be provided to activate the cylinder.

In view of the above, it will be seen that several advantages of the present invention have been achieved and other advantageous results have been obtained.

I claim:

1. A fuel injector remover for removing a fuel injector from a cylinder head of an engine wherein the fuel injector is located within a counterbore of the cylinder head, the remover comprising:

a prime mover having a piston capable of translational motion from a first position to a second position, wherein the piston defines a central bore;

a snout portion attached to the prime mover and defining a central bore generally coaxial with the central bore of the piston and having a first end and a second end, the second end being attached to the prime mover and wherein the first end defines a tapered portion sized such that the tapered portion will abut an outer diameter of the cylinder head counterbore to center the prime mover over the fuel injector;

a puller rod having a first end adapted to be removably engaged with the fuel injector and a second threaded end, the puller rod extending through the central bores of the piston and the snout;

a threaded fastener for attachment to the second threaded end of the puller rod after the puller rod has been inserted through the central bore of the piston;

wherein when the puller rod has been attached to the fuel injector, the puller rod has been inserted through the central bore of the piston, and the fastener has been attached to the puller rod, the prime mover may be operated to force the piston from the first position to the second position to separate the fuel injector from the cylinder head.

2. A fuel injector remover for removing a fuel injector from a cylinder head of an engine comprising:

a prime mover capable of tanslational motion from a first position to a second position;

a snout portion having a first end and a second end, the second end being attached to the prime mover and the first end defining a tapered portion sized such that when the tapered portion abuts an outer diameter of a counterbore of the cylinder head the snout portion is centered within the counterbore to locate the prime mover over the fuel injector;

a puller rod having a first end adapted to be removably engaged with the fuel injector and a second end removably engageable with the prime mover while the second end is engaged with the fuel injector, with the puller rod being movable by the prime mover from a first position where the first end of the puller rod is adjacent the first end of the snout portion to a second position where the first end of the puller rod is spaced from the first end of the snout portion, movement of the puller rod to the second position thereof then operating to separate the fuel injector from the cylinder head, the puller rod freely achieving separation of the fuel injector;

further comprising a reduced diameter section attached to the second end of the snout portion and adjacent the tapered portion capable of extending into the counterbore of the cylinder head; and an interface flange located between the prime mover and the snout portion, the interface flange defining a central cavity continuous with the central bore of the snout portion the central cavity having a tapered portion sized such that the tapered portion prevents removal of the first end of the puller rod through the interface flange.

3. The fuel injector remover of claim 2 further comprising a threaded fastener for attachment to the second end of the puller rod after the second end has been inserted through a central bore defined by the snout portion and the prime mover, with the fastener being sized such that the puller rod is captured on the prime mover and within the central bore of the snout portion when the fastener is attached.

4. The fuel injector remover of claim 2 wherein the prime mover is a hydraulic cylinder.

5. The fuel injector remover of claim 2 wherein the puller rod further comprises at least two opposed flat surfaces for enabling a wrench to rotate the puller rod.

6. The fuel injector remover of claim 2 wherein the puller rod further comprises a hex-shaped outer surface for enabling a wrench to rotate the puller rod.

7. The fuel injector remover of claim 2 wherein the first end of the snout portion has two opposed flat surfaces that define a narrowed dimension.

8. The fuel injector remover of claim 2 wherein the second end of the snout portion has two flat surfaces that define a narrowed dimension.

9. The fuel injector remover of claim 2 wherein the puller rod defines a tapered portion of generally the same angle as the tapered portion of the interface flange.

10. A fuel injector remover for removing a fuel injector from a cylinder head of an engine comprising:

a prime mover capable of translational motion from a first position to a second position;

a snout portion having a first end and a second end, the second end being attached to the prime mover and the first end engageable with the cylinder head, the snout portion and the prime mover together defining a central bore;

a puller rod having a first end adapted to be removably engaged with the fuel injector and movable by the prime mover from a first position where the first end of the puller rod is adjacent the first end of the snout portion to a second position where the first end of the puller rod is spaced from the first end of the snout portion; and an interface flange located between the prime mover and the snout portion, the interface flange defining a central cavity continuous with the central bore of the snout portion, the central cavity having a tapered portion sized such that the tapered portion prevents removal of the first end of the puller rod through the interface flange.

11. The fuel injector remover of claim 10 further comprising a threaded fastener for attachment to a second end of the puller rod after the puller rod has been inserted through the central bore of the snout portion and the prime mover, the fastener being sized such that the puller rod is captured on the prime mover and within the central bore of the snout portion when the fastener is attached.

12. The fuel injector remover of claim 10 wherein the prime mover is a hydraulic cylinder.

13. The fuel injector remover of claim 10 wherein the puller rod further comprises at least two opposed flat surfaces for enabling a wrench to rotate the puller rod.

14. The fuel injector remover of claim 10 wherein the puller rod further comprises a hex-shaped outer surface for enabling a wrench to rotate the puller rod.

15. The fuel injector remover of claim 10 wherein the first end of the snout portion has two opposed flat surfaces that define a narrowed dimension.

16. The fuel injector remover of claim 10 wherein the second end of the snout portion has two flat surfaces that define a narrowed dimension.

17. The fuel injector remover of claim 10 wherein the puller rod defines a tapered portion of generally the same angle as the tapered portion of the interface flange.

18. The fuel injector remover of claim 10 wherein the first end of the snout portion defines a tapered portion sized such that when the tapered portion abuts an outer diameter of a counterbore of the cylinder head the snout portion is centered within the counterbore to locate the prime mover over the fuel injector.

19. The fuel injector remover of claim 18 further comprising a reduced diameter section attached to the first end of the snout portion and adjacent the tapered portion capable of extending into the counterbore of the cylinder head.

20. A fuel injector remover for removing a fuel injector from a cylinder head of an engine comprising:

a prime mover capable of translational motion from a first position to a second position;

a snout portion having a first end and a second end, the second end being attached to the prime mover and the first end defining a tapered portion sized such that when the tapered portion abuts an outer diameter of a counterbore of the cylinder head the snout portion is centered within the counterbore to locate the prime mover over the fuel injector;

a puller rod having a first end adapted to be removably engaged with the fuel injector and a second end removably engageable with the prime mover while the second end is engaged with the fuel injector, with the puller rod being movable by the prime mover from a first position where the first end of the puller rod is adjacent the first end of the snout portion to a second position where the first end of the puller rod is spaced from the first end of the snout portion for separating the fuel injector from the cylinder head; and a threaded fastener for attachment to the second end of the puller rod after the second end has been inserted through a central bore defined by the snout portion and the prime mover, with the fastener being sized such that the puller rod is captured on the prime mover and within the central bore of the snout portion when the fastener is attached.

21. A fuel injector remover for removing a fuel injector from a cylinder head of an engine comprising:

a prime mover capable of translational motion from a first position to a second position;

a snout portion having a first end and a second end, the second end being attached to the prime mover and the first end defining a tapered portion sized such that when the tapered portion abuts an outer diameter of a counterbore of the cylinder head the snout portion is centered within the counterbore to locate the prime mover over the fuel injector, and a puller rod having a first end adapted to be removably engaged with the fuel injector and a second end removably engageable with the prime mover while the second end is engaged with the fuel injector, with the puller rod being movable by the prime mover from a first position where the first end of the puller rod is adjacent the first end of the snout portion to a second position whore the first end of the puller rod is spaced from the first end of the snout portion for separating the fuel injector from the cylinder head, the puller rod further comprising a hex-shaped outer surface for enabling a wrench to rotate the puller rod.

22. A fuel injector remover for removing a fuel injector from a cylinder head of an engine comprising:

a prime mover capable of translational motion from a first position to a second position;

a snout portion having a first end and a second end, the second end being attached to the prime mover and the first end defining a tapered portion sized such chat when the tapered portion abuts an outer diameter of a counterbore of the cylinder head the snout portion is centered within the counterbore to locate the prime mover over the fuel injector;

a reduced diameter section attached to the second end of the snout portion and adjacent the tapered portion capable of extending into the counterbore of the cylinder head;

a puller rod having a first end adapted to be removably engaged with the fuel injector and a second end removably engageable with the prime mover while the second end is engaged with the fuel injector, with the puller rod being movable by the prime mover from a first position where the first end of the puller rod is adjacent the first end of the snout portion to a second position where the first end of the puller rod is spaced from the first end of the snout portion for separating the fuel injector from the cylinder head; and an interface flange located between the prime mover and the snout portion, the interface flange defining a central cavity continuous with the central bore of the snout portion, the central cavity having a tapered portion sized such that the tapered portion prevents removal of the first end of the puller rod through the interface flange.

23. A fuel injector remover for removing a fuel injector from a cylinder head of an engine comprising:

a prime mover capable of translational motion from a first position to a second position;

a snout portion having a first end and a second end, the second end being attached to the prime mover and the first end defining a tapered portion sized such that when the tapered portion abuts an outer diameter of a counterbore of the cylinder head the snout portion is centered within the counterbore to locate the prime mover over the fuel injector;

a reduced diameter section attached to the second end of the snout portion and adjacent the tapered portion capable of extending into the counterbore of the cylinder head;

a puller rod having a first end adapted to be removably engaged with the fuel injector and a second end removably engageable with the prime mover while the second end is engaged with the fuel injector, with the puller rod being movable by the prime mover from a first position where the first end of the puller rod is adjacent the first end of the snout portion to a second position where the first end of the puller rod is spaced from the first end of the snout portion for separating the fuel injector from the cylinder head; and an interface flange located between the prime mover and the snout portion, the interface flange defining a central cavity continuous with the central bore of the snout portion, the central cavity having a tapered portion sized such that the tapered portion prevents removal of the first end of the puller rod through the interface flange, the puller rod defining a tapered portion of generally the same angle as the tapered portion of the interface flange.

* * * * *